(12) United States Patent  
Miller (10) Patent No.: US 11,915,566 B2  
(45) Date of Patent: Feb. 27, 2024

(54) METHODS AND SYSTEMS FOR PEDESTAL PROJECTING IN A RETAIL ENVIRONMENT

(71) Applicant: Sensormatic Electronics, LLC, Boca Raton, FL (US)

(72) Inventor: Channing E. Miller, Fort Lauderdale, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 399 days.

(21) Appl. No.: 17/031,326

(22) Filed: Sep. 24, 2020

(65) Prior Publication Data

US 2021/0097823 A1    Apr. 1, 2021

Related U.S. Application Data

(60) Provisional application No. 62/906,497, filed on Sep. 26, 2019.

(51) Int. Cl.
| | |
|---|---|
| *G08B 13/00* | (2006.01) |
| *G03B 21/14* | (2006.01) |
| *G08B 5/36* | (2006.01) |
| *G09F 19/18* | (2006.01) |
| *H04N 9/31* | (2006.01) |

(52) U.S. Cl.
CPC .......... *G08B 13/00* (2013.01); *G03B 21/145* (2013.01); *G08B 5/36* (2013.01); *G09F 19/18* (2013.01); *H04N 9/3141* (2013.01)

(58) Field of Classification Search
CPC ...... G08B 13/00; G08B 5/36; G08B 13/2482; G03B 21/145; G09F 19/18; G09F 19/22; H04N 9/3141; H04N 9/3147; H04N 9/3179; H04N 7/183; H04N 9/3194; G06Q 30/0259

See application file for complete search history.

(56) References Cited

U.S. PATENT DOCUMENTS

| | | | |
|---|---|---|---|
| 2006/0038927 A1* | 2/2006 | Saletta | H04N 9/3194 348/E9.027 |
| 2013/0176398 A1 | 7/2013 | Bonner et al. | |
| 2016/0078791 A1* | 3/2016 | Helms | H04N 9/3141 348/789 |
| 2017/0221099 A1 | 8/2017 | Fernandez et al. | |
| 2022/0234194 A1* | 7/2022 | Deyle | B25J 9/1679 |

FOREIGN PATENT DOCUMENTS

| | | |
|---|---|---|
| CN | 2502288 Y | 7/2002 |

* cited by examiner

*Primary Examiner* — Michael E Teitelbaum  
(74) *Attorney, Agent, or Firm* — ArentFox Schiff LLP (57) ABSTRACT

Examples described herein generally relate to a system and method for projecting content in a retail environment. The system and method may include an image projector for projecting content on a surface of the retail environment. The system and method may also include a security pedestal comprising the image projector. The system and method may also include receiving at the image projector a first signal indicating a first content to be projected. The system and method may also include receiving at the image projector a second signal indicating a second content to be projected after the first content.

27 Claims, 5 Drawing Sheets

METHODS AND SYSTEMS FOR PEDESTAL PROJECTING IN A RETAIL ENVIRONMENT

CROSS-REFERENCE TO RELATED APPLICATIONS

The present document claims priority to U.S. Provisional Patent Application Ser. No. 62/906,497 filed on Sep. 26, 2019, and the contents is incorporated by reference herein in the entirety.

BACKGROUND

The present disclosure relates to projecting images onto surfaces at or near retail locations, and more particularly to projecting images/videos by a projector mounted to a security pedestal at a retail environment on to a floor near an entrance/exit.

Retailers are in a constant battle to win the attention of a consumer and/or sales, but often times a consumer is distracted by other life events, for example, their mobile phone, as the consumer walks past a retail location, or merely uninterested in visiting a specific retailer. In order to win the attention and/or sale of a consumer, a specific retailer may provide diversions, for example, displays in the windows of the retail location, flashing lights, scents, etc., to try and gain the attention and/or sale of the consumer. Although some of these diversion tactics may prove to be successful to gain the attention and/or sale of a customer, these retail locations have very little space and time to succeed with the diversion tactics, specifically at entrances of retail locations. Additionally, although advertisements or other types of materials, for example, signs and pictures, may be placed and/or affixed to the pedestal scanners, consumers may crowd the entrance and/or exit to read or view the ad, thereby causing negative issues.

Thus, there is a need in the art for improvements in providing alluring distractions to consumers near entrances and/or exits of a retail location in order to gain attention and/or sale of a customer. In particular, there is a need for systems and methods for pedestal projecting in a retail environment.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In one aspect, the disclosure provides a system, method and non-transitory computer readable medium storing computer executable instructions that may be executed by a processor for projecting content in a retail environment. The system, method and non-transitory computer readable medium may include an image projector for projecting content on a surface of the retail environment. The system, method and non-transitory computer readable medium may also include a security pedestal comprising the image projector. The system, method and non-transitory computer readable medium may also include receiving at the image projector a first signal indicating a first content to be projected. The system, method and non-transitory computer readable medium may also include receiving at the image projector a second signal indicating a second content to be projected after the first content.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

This disclosure relates to systems and methods for a pedestal projecting images on surfaces in a retail environment. The present disclosure describes a system having a security pedestal located at an entrance or exit to a retail location. Additionally, the security pedestal has an image projector attached to project images on surfaces on or near the entrance or exit to a retail location. The disclosed pedestal projecting system and methods may improve the ability to flexibly locate images in a retail environment, and/or the flexible image placement functionality may avoid crowding near and/or interference with the functionality of the security pedestal.

Figure 1:
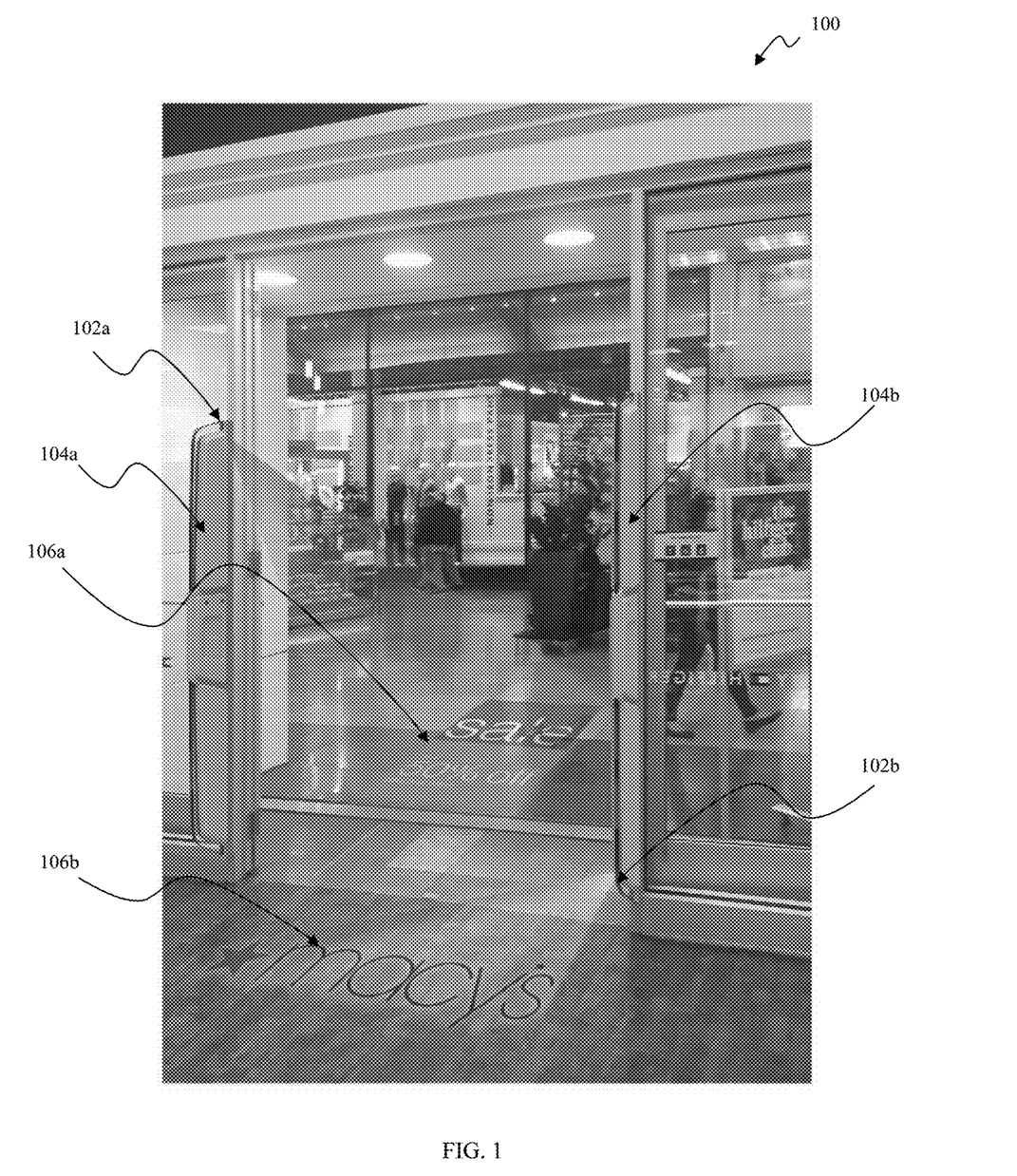
FIG. 1 is a schematic diagram of an example retail location including a first example of a pedestal projection system.

Referring now to FIG. 1, an example retail location 100 includes multiple pedestal scanners 104a and 104b. Although two pedestals are shown, any number of pedestals may be implemented. The pedestal scanners 104a and 104b may be placed near an entrance or exit to a retail location for security purposes. For example, the retail location 100 may have an entrance or exit located within a mall for customers to use when entering the retail location or exiting the retail location with their purchased items. The pedestal scanners 104a and 104b may be placed at these locations to alert workers of theft of items. For example, the pedestal scanners 104a and 104b may scan for security tags, as discussed below, placed on items to alert workers of theft. In another example, a customer may have purchased an item, but a worker failed to disable or remove the security tag, thus the pedestal scanners 104a and 104b may scan for security tags and thereby also alerting the workers of an issue. A person of skill in the art would understand that the disclosed systems and methods are applicable to a variety of retail locations and the present disclosure is not limited to the example retail location or areas.

As discussed above, retailers (e.g., apparel retailers) have deployed security tags such as acousto-magnetic or radio frequency identification (RFID) systems in stores to track product/item movements as the products/items arrive at stores, are placed on display on the sales floor, and are sold. For example, as customers enter and exit the retail location, the customers pass through one or more pedestal scanners 104a and 104b. Items, such as products sold by the retail establishment may include an security tag, not shown, (e.g., a RFID tag, an acousto-magnetic tag, or any other type of electronic article surveillance device) may be scanned by the pedestal scanners 104a and 104b to determine whether the item was paid for or not. For example, when the item is paid for, the security tag may be removed or deactivated so that the security tag will not be detected by the pedestal scanners 104a and 104b.

In some instances, the pedestal scanners 104a and 104b may detect that the item having the security tag is located near the scanners, and hence may be unpaid for and is being carried out of the retail location by an individual. As such, and discussed below, the pedestal scanners 104a and 104b and/or the security system may generate a security alert signal, which may activate one or more notification devices, such as an audio alarm device, a strobe or flashing light device, an image projected onto a surface and/or a notification message sent to security and/or store personnel.

In one aspect, the pedestal scanners 104a and 104b may include image projectors 102a and 102b, respectively. Although two image projectors are shown, any number of any number of image projectors may be implemented, for example, a single pedestal scanner and/or a plurality of pedestal scanners. The image projectors 102a and 102b may be embedded and built within the pedestal scanners 104a and 104b. For example, the image projectors 102a and 102b, may be placed within the unit of the pedestal scanners 104a and 104b during production of the scanners to be incorporated into the overall design. In another aspect, the image protectors 102a and 102b may be attached to the pedestal scanners 104a and 104b after the scanners are built. For example, the image projectors 102a and 102b may contain a device for attaching the image projector to the pedestal scanner (e.g., a clip, bracket, attachment, etc.). In another aspect, the pedestal scanners 104a and 104b may contain a device for attaching the projector to the pedestal scanner (e.g., a clip, bracket, attachment, etc.). As shown in FIG. 1, the image projectors 102a and 102b may be positioned to project an image, logo, advertisement, etc., as shown as 106a and 106b, respectively, onto a floor near the entrance or exit, but one skilled in the art would recognize that the image may be projected onto any nearby surface by the image projectors 102a and 102b. For example, images 106a and 106b may be projected onto a wall, ceiling, etc. In another aspect, the images 106a and 106b may be considered content, for example, still images, moving images, such as videos or .gifs, etc. In one aspect the image projectors 102a and 102b may be placed at any location on or in the pedestal scanners 104a and 104b. For example, as illustrated in FIG. 1, image projector 102a is placed at the top of the pedestal scanner 104a, and image projector 102b is placed at the bottom of the pedestal scanner 104b.

In another aspect of the disclosure, the image projectors 102a and 102b may be aligned to project the content at a distance outside the magnetic field of the pedestal scanners 104a and 104b. For example, projecting the content at a distance for best viewing—floor, wall, ceiling, etc., rather than directly on a pedestal scanner 104a and 104b.

In another aspect of the disclosure, the image projectors 102a and 102b may also comprise a motorized adjustment device to adjust and/or change the alignment of the projected content from the image projectors. For example, a motor may be placed at the base of the image projectors 102a and 102b to continuously scroll the content to be projected up and down on the surface. For example, the content 106a and 106b may move to the left and right when projected onto the floor. In another aspect of the disclosure, the alignment of the image projectors 102a and 102b may be adjusted by the motors remotely via a wired or wireless connection discussed below. In another aspect of the disclosure, the alignment of the image projectors 102a and 102b may be adjusted by the motors by controls directly on the image projectors and/or the pedestal scanners 104a and 104b. In another aspect of the disclosure, the alignment of the image projectors 102a and 102b may be continuously be adjusted, for example, constantly moving left and right. In another aspect of the disclosure, the alignment of the image projectors 102a and 102b may be controlled on demand by a user and/or the user of the server.

The image projectors 102a and 102b may be a digital light processing ("DLP") projector, a liquid crystal display ("LCD") projector, etc. Further, the image projectors 102a and 102b may have a brightness rating up to 28,000 lumens in order to be visible at a wide range of ambient lighting. Further, the image projectors 102a and 102b may have different types of lenses based on the placement location. For example, the lens may be a short-throw lens, a long-throw lens, a wide-angle lens, etc. In one aspect, the image projectors 102a and 102b may be powered directly from the pedestal scanners 104a and 104b, respectively, by drawing power directly from the powered pedestal scanners via hardwiring. In another aspect, the image projectors 102a and 102b may be powered individually by an electrical outlet, or by a battery. Further, as discussed below, the image projectors 102a and 102b may have wireless and/or wired connectivity to obtain content to project, for example, graphics, logos, videos, etc. The connectivity may be a wired or wireless connection, such as but not limited to a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or other suitable connections. Additionally, the computer device 12 may communicate with one or more other computer devices 16 via a network 18, which may include a local area network (LAN), a wide area network (WAN), a cellular network, a WiFi network, a satellite network, an intranet, a metropolitan area network (MAN), the global Internet, a wired network, a wireless network, or any combination thereof.

Figure 2:
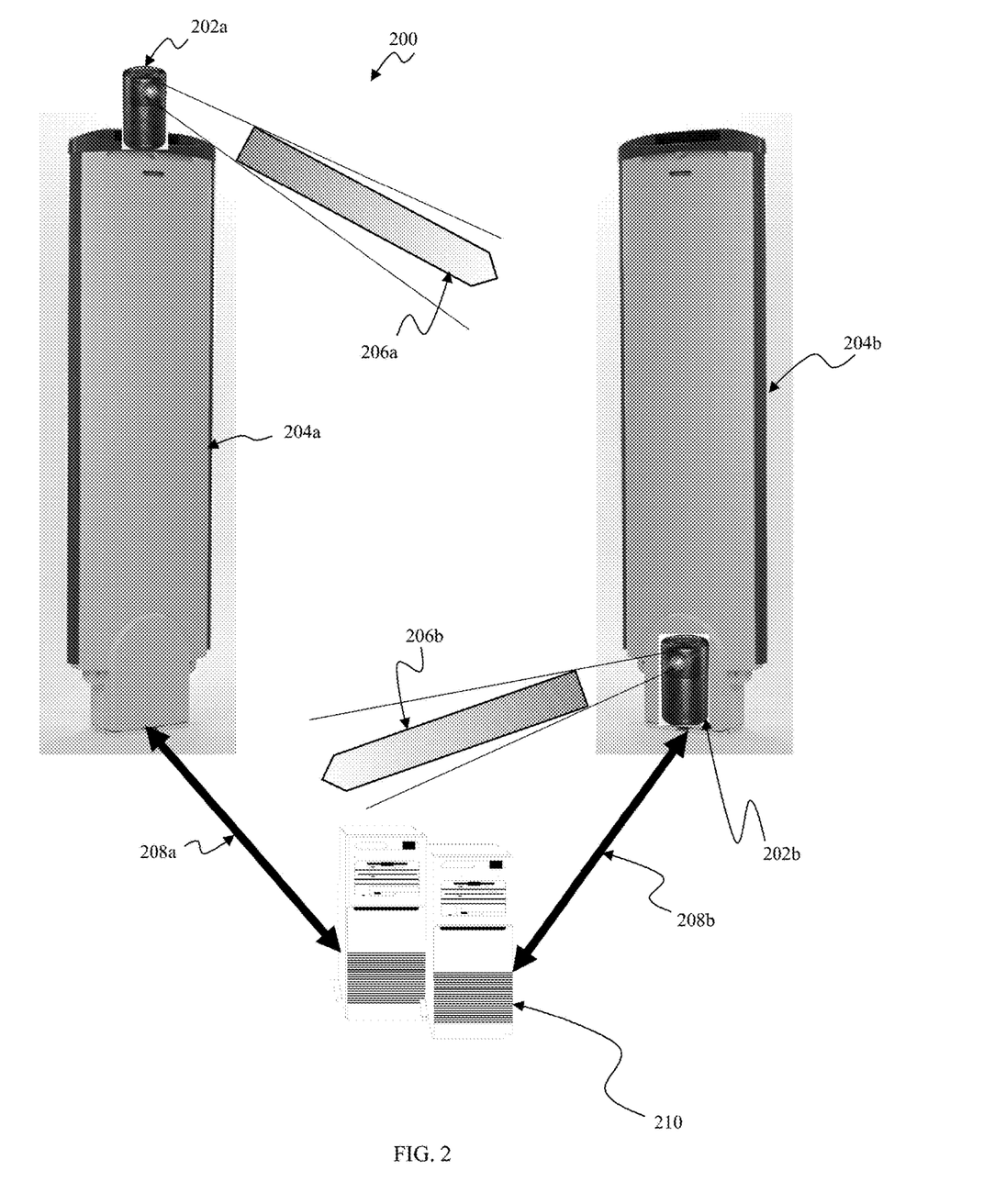
FIG. 2 is a schematic diagram of an example retail location including a second example of a pedestal projection system.

Turning to FIG. 2, is a schematic diagram of an example retail location including a second example of a pedestal projection system. The reference numbers as used in FIG. 1, described above, correlate to the reference numbers shown in FIG. 2, e.g., merely increased by 100. For example, the image projectors as referenced in FIG. 1 as 102a and 102b, are referenced as 202a and 202b, respectively, the pedestal scanner 104a and 104b are referenced as 204a and 204b, and the images 106a and 106b are referenced as 206a and 206b.

Referring to FIG. 2, the example retail location 200 may also have a server 210, and be in communication with the image projectors 202a and 202b, and/or the pedestal scanners 204a and 204b. The server may be located on site of the retail location, located in a remote location from the retail location, or be based in the cloud.

In one aspect, the server 210 may be a security server monitoring the potential theft of items based on the pedestal scanners 204a and 204b, as described above. For example, the pedestal scanners 204a and 204b may detect that an item is exiting a retail location without being purchased based on a RFID tag on the item. The pedestal scanners 204a and 204b may transmit a signal to the server 210. For example, the signal may indicate to the server 210 that inventory of a specific item should be reduced based upon the item exiting the store, and/or to notify the server to activate an alert signal. As described below, based on a signal from the pedestal scanners 204a and 204b to the server 210 that an item is being stolen, an alert may be triggered by the server 210 to the image projectors 202a and 202b to project a specific image on a surface. The content to be projected by the image projectors 202a and 202b may be supplied by the server 210 via a wired or wireless connection, as described below, or may be stored directly on the image projectors.

In another aspect, the server 210 may be a content supplier for the image projectors 202a and 202b, as described above. In one aspect, different content may be loaded onto the server 210 for projection by the image projectors 202a and 202b. A user may instruct the image projectors 202a and 202b to project specific content stored on the server 210. For example, during the holiday season different content may be loaded onto the server to coincide with the specific holiday. In another example, if a retail location is conducting a sale then content for the sale may be loaded. Further, the server 210 may be connected to the image projectors 202a and 202b, by a wired or wireless connection, as described above. Further, the server 210 may be connected to the pedestal scanners 204a and 204b, with a wired or wireless connection, as described above.

In another aspect, the image projectors 202a and 202b may store content to be projected by each projector. For example, content may be supplied to the image projectors 202a and 202b by a wired or wireless connection, for example, the logo of a retailer may be loaded and stored on each image projector. Each projector may have self-contained content stored on memory. In an aspect, and as described above, based on a signal from the pedestal scanners 204a and 204b to the server 210 that an item is being stolen, an alert may be triggered by the server 210 to the image projectors 202a and 202b to project a specific image or content stored on their respective internal memory. In another aspect, and as described above, based on a signal from the pedestal scanners 204a and 204b to the server 210 and the image projectors 202a and 202b, that an item is being stolen, an alert may be triggered by the pedestal scanners 204a and 204b to the image projectors 202a and 202b directly to project a specific image or content stored on their respective internal memory. For example, the alert signal may trigger the image projectors 202a and 202b to project the image or content directed to attempting to alert of the potential theft (e.g., a stop sign, a red colored "X", or the words "STOP").

In another aspect, the image projectors 202a and 202b may display welcome type content, personalized content for each specific customer, interactive content and the like based on specific customer types. In one aspect of the disclosure, information regarding a consumer may be obtained from physical features, for example, facial recognition, gait, clothes, etc., and/or from data obtained from a personal mobile device, for example, sniffing, QR code, etc. The obtained information may be used to project and image specifically targeted to the consumer, for example, "Hi Bob! Welcome Back!"

Figure 3:
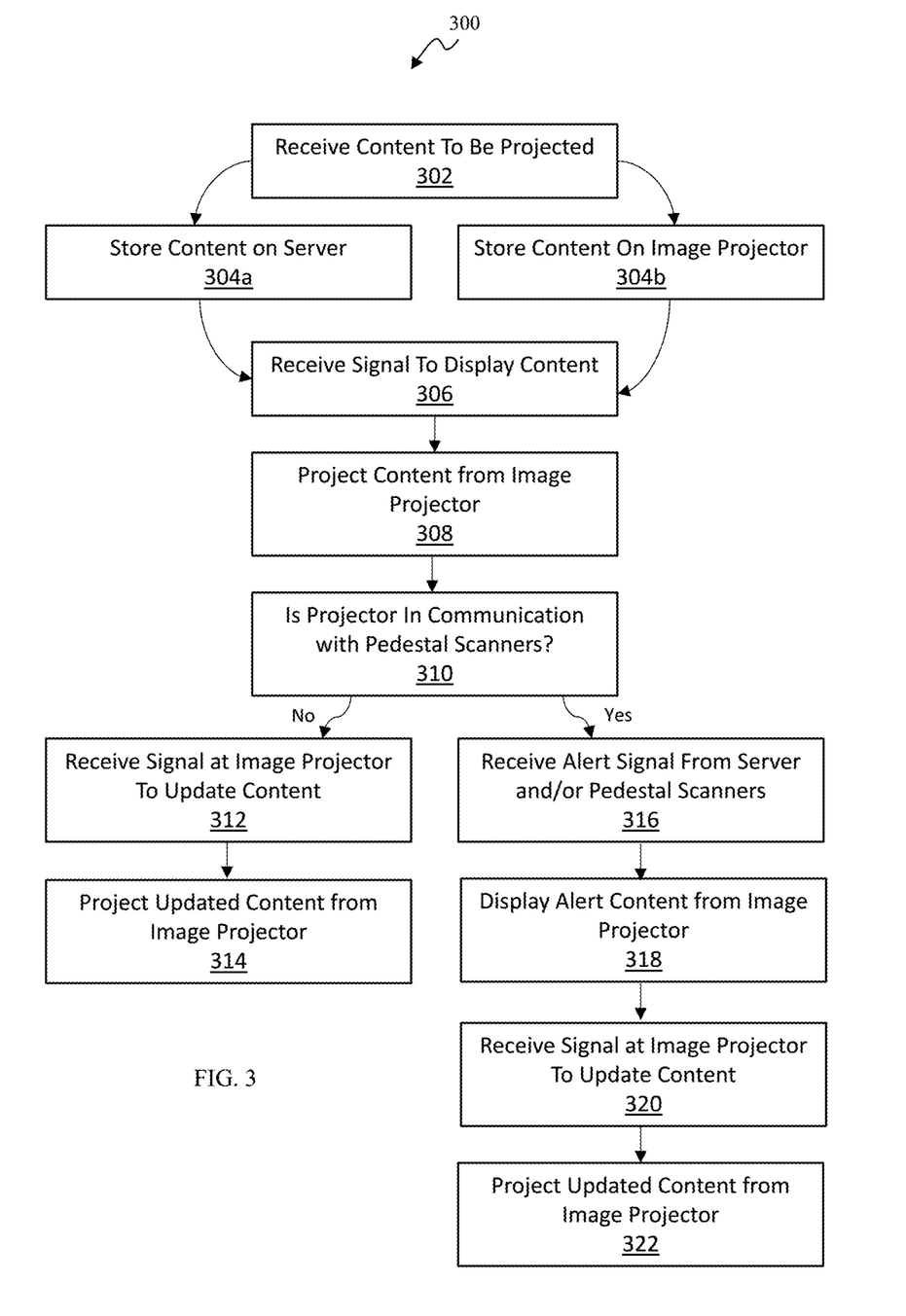
FIG. 3 is a flowchart of an example method of pedestal projecting, in accordance with an implementation of the present disclosure.

Turning to FIG. 3, an example method 300 for pedestal projecting in a retail environment. For example, method 300 may be performed in conjunction with the computer system 400 described below in relation to FIG. 4.

At block 302, the method 300 may include receiving content to be stored and projected by the image projectors. The content may be received via the wired and/or wireless connection described above. In an aspect, for example, the content may be still images and/or moving images, as described above. In an another aspect, for example, the content may be provided to the system by a third party developer, corporate headquarters of a retail location, on site by the retail location, etc.

At blocks 304a and 304b, the method 300 may include storing the received content to be projected by the image projectors on a server or on the image projector itself. As described above, any number of image projectors and/or security pedestals may be implemented (e.g., 1, 2, 3, etc.). For example, with reference to FIG. 2, the content to be projected may be stored on image projectors 202a and 202b within memory (not shown), or on a server 210. As described above, the server may be remote to the location of the image projectors, on site of the image projector at the retail location or in the cloud.

At block 306, the method 300 may include receiving a signal for the image projectors 202a and 202b to project specific stored content. For example, a user may send a signal to the image projectors 202a and 202b or the server 210, depending upon where the content is stored, to have the image projectors project a selected image on a surface. In another aspect, the image projectors 202a and 202b may receive a predetermined signal to project a predetermined image on a surface. At block 308, the method 300 may include the image projectors projecting an image. In one aspect, the image projected by the image projectors 202a and 202b may be the same or may be different. The image to be projected may be provided by the server 210 or retrieved from the memory of the image projectors 202a and 202b depending upon where the content is stored.

At block 310, the method 300 may split depending upon if the image projectors 202a and 202b are in communication with pedestal scanners 204a and 204b. If projectors 202a and 202b are not in communication with pedestal scanners 204a and 204b, method 300 proceeds to sub-block 312. If projectors 202a and 202b are in communication with pedestal scanners 204a and 204b, the method 300 proceeds to sub-block 316.

At sub-block 312, the method 300 may include receiving an update signal at the image projector to update the content projected. As described above in relation to block 306, the method 300 may include receiving an update signal to update the specific content projected. For example, a user may send an update signal to the image projectors 202a and 202b or the server 210, depending upon where the content is stored, to have the image projectors project an updated selected image on a surface. In another aspect, the image projectors 202a and 202b may receive a predetermined signal to project a updated predetermined image on a surface. As described above, content may be considered, for example, still images, moving images, such as videos or .gifs, etc. At block 314, the method 300 may include the image projectors projecting an updated image. In one aspect, the updated image projected by the image projectors 202*a* and 202*b* may be the same or may be different. The image to be projected may be provided by the server 210 or retrieved from the memory of the image projectors 202*a* and 202*b* depending upon where the content is stored.

At sub-block 316, the method 300 may include receiving an alert signal from either the server and/or the pedestal scanners 204*a* and 204*b*. The alert signal may trigger the image projectors 202*a* and 202*b* to project alert images on a surface, as described above. The alert signal may be generated based on a determination by the pedestal scanners 204*a* and 204*b* that an item is leaving the retail location without being purchased by a consumer. In another aspect, the alert signal may be generated based upon a consumer being too close to the location of the pedestal scanners (e.g., too close to the entrance and/or exit of the retail location).

At sub-block 318, the method 300 may include projecting the alert image based on the generated alert signal. In one aspect, the alert image projected by the image projectors 202*a* and 202*b* may be the same or may be different. The alert image to be projected may be provided by the server 210 or retrieved from the memory of the image projectors 202*a* and 202*b* depending upon where the content is stored.

At sub-block 320, the method 300 may include receiving an update signal at the image projector to update the content projected. The update signal may be pre-set or random. For example, first content may be pre-set to be projected for 5 minutes, and then project second content for 5 minutes, etc. In another example, the first content may be set to be projected indefinitely, and then randomly receive based upon a user, third-party, etc., an update signal to project second content for 5 minutes and/or indefinitely. As described above in relation to blocks 306 and 312, the method 300 may include receiving an update signal to update the specific content projected. For example, a user may send an update signal to the image projectors 202*a* and 202*b* or the server 210, depending upon where the content is stored, to have the image projectors project an updated selected image on a surface. In another aspect, the image projectors 202*a* and 202*b* may receive a predetermined signal to project a updated predetermined image on a surface. At block 322, the method 300 may include the image projectors projecting an updated image. In one aspect, the image projected by the image projectors 202*a* and 202*b* may be the same or may be different. The image to be projected may be provided by the server 210 or retrieved from the memory of the image projectors 202*a* and 202*b* depending upon where the content is stored.

More aspects may be using a display projector so that an image can be presented onto any surface near the pedestal. The projector may be either part of the original pedestal or added as an accessory. The projector may be aimed so that the image is shown on the floor, walls or ceiling or where ever best displayed so that passing shoppers can see the image. The displayed image may be any image such as promotional, holiday, sale, in store items, etc. that is uploaded to the system software and may be part of the security system so that alerts and LP activity may be projected as an image or color. The projector may be motorized so that the images are in motion or static. Many special features may be implemented such as pulsing, changing or rotating images. Further, a prime area for customer interaction, information, advertising and attention is at the store front entrance/exit. This is the first point of contact to the shopper and is often the area for targeted advertising of sales, promotions, new items, holiday events etc. Having the ability to augment this important area for customer interaction and information directly to shoppers both entering the store and those passing by will translate into greater foot traffic, awareness and potential sales increase. This real estate is where our current pedestals reside and gives retail locations the unique opportunity to sell advertising and promotional "displays." Sold as a monthly advertising subscription or tied into the stores marketing output this ability could be translated into financial opportunity for clients or retail locations.

Figure 4:
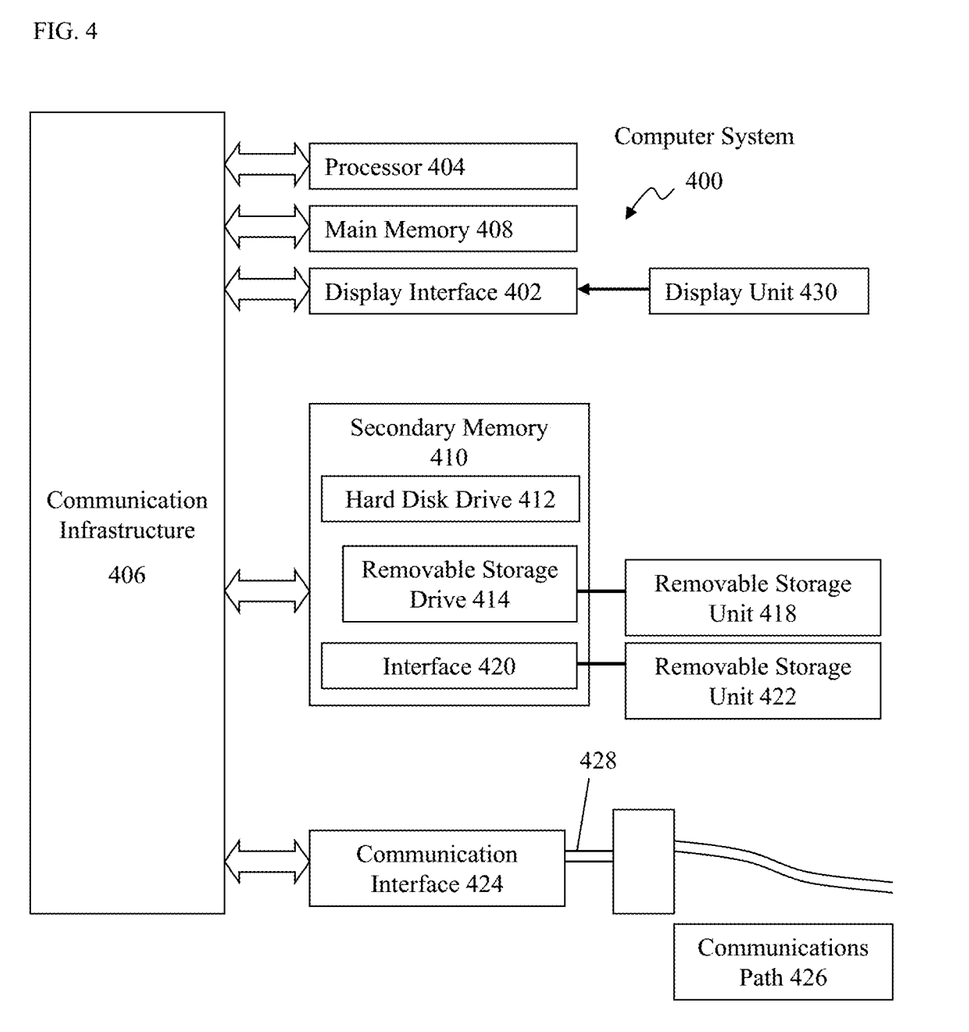
FIG. 4 is an example block diagram of various hardware components and other features of a computer system that may operate the access control system in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). Various software implementations are described in terms of this example computer system. After reading this description, it will become apparent to a person skilled in the relevant art(s) how to implement implementations of the disclosure using other computer systems and/or architectures.

Computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, a magnetic tape drive, an optical disk drive, a universal serial bus (USB) flash drive, etc. The removable storage drive 414 reads from and/or writes to a removable storage unit 418 in a well-known manner. Removable storage unit 418 represents a floppy disk, magnetic tape, optical disk, USB flash drive etc., which is read by and written to removable storage drive 414. As will be appreciated, the removable storage unit 418 includes a computer usable storage medium having stored therein computer software and/or data.

Alternative implementations of the present disclosure may include secondary memory 410 and may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 418, a hard disk installed in hard disk drive 412, and signals 428. These computer program products provide software to the computer system 400. Implementations of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with implementations of the present disclosure, as discussed herein. In particular, the computer programs, when executed, enable the processor 404 to perform the features in accordance with implementations of the present disclosure. Accordingly, such computer programs represent controllers of the computer system 400.

In an aspect of the present disclosure where the disclosure is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
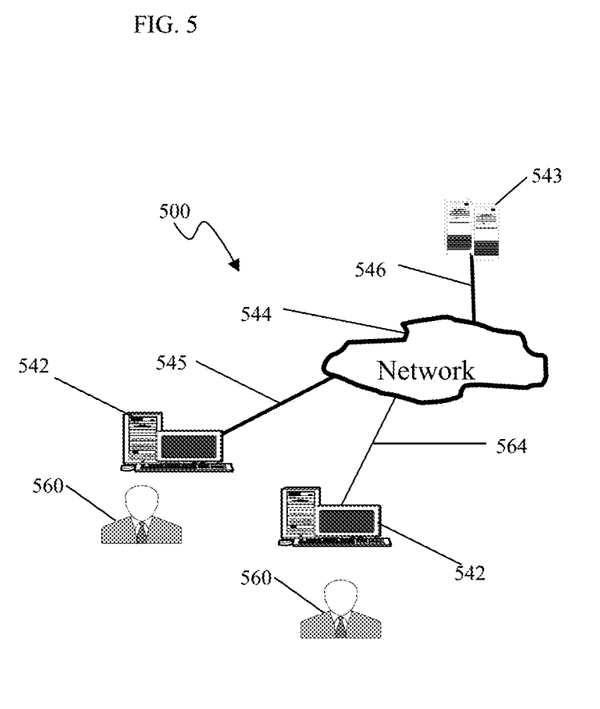
FIG. 5 is a block diagram of various example system components, for use in accordance with aspects of the present disclosure.

FIG. 5 is a block diagram of various example system components, in accordance with aspects of the present disclosure. FIG. 5 shows a communication system 500 including one or more accessors 560 (also referred to interchangeably herein as one or more "users"), one or more terminals 542. Terminals 542 can include system 100 and/or 200, described above, or a related system, and/or the like. In one aspect, data for use in accordance with aspects described herein may be input and/or accessed by accessors 560 via terminal 542, such as personal computers (PCs), minicomputers, mainframe computers, microcomputers, telephonic devices, or wired/wireless devices, such as personal digital assistants ("PDAs") and RFID readers (e.g., handheld, mobile, cabinets, etc.) coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The couplings 545, 546, 564 may include wired, wireless, or fiber-optic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A system for projecting content in a retail environment, comprising:

a first security pedestal mounted at a first fixed location and includes a first image projector at a base of the first security pedestal;

a second security pedestal mounted at a second fixed location and includes a second image projector at a top of the second security pedestal;

wherein the first image projector and the second image projector are configured to project respective content on a surface of the retail environment;

wherein the first image projector is further configured to receive a first signal indicating a first content to be projected, wherein the second image projector is further configured to receive a second signal indicating a second content to be projected, wherein the first image projector is configured to receive a third signal indicating a third content to be projected after the first content, wherein the second image projector is configured to receive a fourth signal indicating a fourth content to be projected after the second content, wherein the first fixed location and the second fixed location are in alignment with each other, and wherein the first content and the second content are projected on the surface at different locations.

2. The system of claim 1, further comprising a server connected to the first image projector.

3. The system of claim 2, wherein the server is configured to provide the first content and the third content to the first image projector.

4. The system of claim 3, wherein the server is further configured to transmit the first signal comprising first content to the first image projector, and further configured to transmit the third signal to the first image projector based on an alert generated by the first security pedestal or the second security pedestal.

5. The system of claim 1, wherein the first security pedestal or the second security pedestal is configured to generate an alert signal based upon an indication of a theft of an item in the retail environment.

6. The system of claim 5, wherein the third signal received by the first image projector is the alert signal generated by the first security pedestal or the second security pedestal, and the third content to be projected is an indication based on the theft.

7. The system of claim 1, wherein the first content to be projected is a logo of a retailer, and the third content to be projected is an indication that an item is being stolen from the retailer.

8. A method for projecting content in a retail environment, comprising:

receiving a first signal indicating a first content to be projected on a surface of the retail environment by a first image projector located at a base of a first security pedestal;

receiving a second signal indicating a second content to be projected on the surface of the retail environment by a second image projector located at a top of a second security pedestal;

receiving a third signal indicating a third content to be projected by the first image projector on the surface of the retail environment; and receiving a fourth signal indicating a fourth content to be projected by the second image projector on the surface of the retail environment;

wherein the first security pedestal is mounted at a first fixed location;

wherein the second security pedestal is mounted at a second fixed location;

wherein the first fixed location and the second fixed location are in alignment with each other, and wherein the first content and the second content are projected on the surface at different locations.

9. The method of claim 8, wherein the first image projector is connected to a server.

10. The method of claim 9, further comprising transmitting by the server, the first signal and the third signal indicating the first content and the third content to the first image projector.

11. The method of claim 10, further comprising transmitting by the server, the first signal comprising first content to the first image projector, and transmitting by the server the third signal to the first image projector based on an alert generated by the first security pedestal or the second security pedestal.

12. The method of claim 8, wherein the first security pedestal or the second security pedestal generates an alert signal based upon an indication of a theft of an item in the retail environment.

13. The method of claim 12, wherein the third signal received by the first image projector is the alert signal generated by the first security pedestal or the second security pedestal, and the third content to be projected is an indication based on the theft.

14. The method of claim 8, wherein the first content to be projected is a logo of a retailer, and the third content to be projected is an indication that an item is being stolen from the retailer.

15. A non-transitory computer-readable storage medium containing executable computer program code, the code comprising instructions configured to cause a computing device to:

receive a first signal indicating a first content to be projected on a surface of a retail environment by a first image projector located at a base of a first security pedestal;

receive a second signal indicating a second content to be projected on the surface of the retail environment by a second image projector located at a top of a second security pedestal;

receive a third signal indicating a third content to be projected by the first image projector on the surface of the retail environment; and receive a fourth signal indicating a fourth content to be projected by the second image projector on the surface of the retail environment;

wherein the first security pedestal is mounted at a first fixed locations wherein the second security pedestal is mounted at a second fixed location;

wherein the first fixed location and the second fixed location are in alignment with each other, and wherein the first content and the second content are projected on the surface at different locations.

16. The computer-readable medium of claim 15, wherein the first image projector is connected to a server.

17. The computer-readable medium of claim 16, is further configured to transmit by the server, the first signal and the third signal indicating the first content and the third content to the first image projector.

18. The computer-readable medium of claim 17, is further configured to transmit by the server, the first signal comprising first content to the first image projector, and transmitting by the server the third signal to the first image projector based on an alert generated by the first security pedestal or the second security pedestal.

19. The computer-readable medium of claim 15, wherein the first security pedestal generates an alert signal based upon an indication of a theft of an item in the retail environment.

20. The computer-readable medium of claim 19, wherein the third signal received by the first image projector is the alert signal generated by the first security pedestal or the second security pedestal, and the third content to be projected is an indication based on the theft.

21. The computer-readable medium of claim 15, wherein the first content to be projected is a logo of a retailer, and the third content to be projected is an indication that an item is being stolen from the retailer.

22. The system of claim 1, wherein the first image projector or the second image project comprises a motor and configured to adjust an alignment of the respective image projector.

23. The system of claim 22, wherein the alignment of the first image projector or the second image projector is continuously adjusted.

24. The method of claim 8, wherein the first image projector or the second image project comprises a motor and configured to adjust an alignment of the respective image projector.

25. The method of claim 24, wherein the alignment of the first image projector or the second image projector is continuously adjusted.

26. The computer-readable medium of claim 15, wherein the first image projector or the second image project comprises a motor and configured to adjust an alignment of the respective image projector.

27. The computer-readable medium of claim 26, wherein the alignment of the first image projector or the second image projector is continuously adjusted.

* * * * *